US012791113B1

(12) United States Patent
Sandstrom

(10) Patent No.: US 12,791,113 B1
(45) Date of Patent: Nov. 10, 2026

(54) ADJUSTABLE LIVEWELL OVERFLOW DRAIN

(71) Applicant: Thomas Sandstrom, Oakland Park, FL (US)

(72) Inventor: Thomas Sandstrom, Oakland Park, FL (US)

( * ) Notice: Subject to any disclaimer, the term of this patent is extended or adjusted under 35 U.S.C. 154(b) by 0 days.

(21) Appl. No.: 19/201,456

(22) Filed: May 7, 2025

Related U.S. Application Data

(60) Provisional application No. 63/643,612, filed on May 7, 2024.

(51) Int. Cl.
*F16K 27/04* (2006.01)
*F16K 3/02* (2006.01)
*B63B 35/26* (2006.01)

(52) U.S. Cl.
CPC .......... *F16K 27/044* (2013.01); *F16K 3/0254* (2013.01); *F16K 3/0281* (2013.01); *B63B 35/26* (2013.01)

(58) Field of Classification Search
CPC .... F16K 27/044; F16K 3/0254; F16K 3/0281; B63B 35/26
USPC ................ 251/144, 147, 326–329, 339, 347; 138/40–46; 137/599.01
See application file for complete search history.

(56) References Cited

U.S. PATENT DOCUMENTS

| | | | | |
|---|---|---|---|---|
| 990,706 A * | 4/1911 | Clark | F16K 13/02 | 251/144 |
| 1,926,095 A * | 9/1933 | Thomas | F16K 27/02 | 251/339 |
| 3,559,947 A * | 2/1971 | Sette | F16K 3/02 | 251/300 |
| 4,150,696 A * | 4/1979 | Meier | F16L 55/02718 | 521/902 |
| 5,236,175 A * | 8/1993 | Campau | B63B 35/26 | 251/304 |
| 6,311,727 B1 * | 11/2001 | Campau | F16K 3/265 | 137/625.48 |
| 8,833,734 B2 * | 9/2014 | Patel | B63B 35/26 | 251/351 |
| 12,137,675 B1 | 11/2024 | Brunswick | | |
| 2017/0127658 A1 | 5/2017 | Sarnowski et al. | | |

* cited by examiner

*Primary Examiner* — John Bastianelli
(74) *Attorney, Agent, or Firm* — Mark D. Bowen, Esq.; Malin Haley DiMaggio & Bowen, P.A.

(57) ABSTRACT

An adjustable livewell overflow drain designed for threaded connection to the overflow drain port of a fishing vessel livewell to allow for water supply flow control from within the livewell. An adjustable livewell overflow drain comprises a gate valve featuring a strainer cage and a movable gate slidable disposed within the strainer cage. The gate is operable between a fully closed position, wherein livewell water is contained within the well, and a fully open position, wherein livewell water is allowed to drain out of the well. Adjustment is achieved by manual manipulation of the gave via adjustment arms projecting from the gate and through the strainer cage. The adjustable overflow drain thus allows for flow control within the livewell to allow for livewell pressurization while eliminating the need for manual adjustment of any below deck valves of valves located the vessel bilge.

8 Claims, 6 Drawing Sheets

ADJUSTABLE LIVEWELL OVERFLOW DRAIN

CROSS REFERENCE TO RELATED APPLICATIONS

This application claims the benefit of provisional U.S. Patent Application Ser. No. 63/643,612, filed on May 7, 2024.

STATEMENT REGARDING FEDERALLY SPONSORED RESEARCH OR DEVELOPMENT

N/A

COPYRIGHT NOTICE

A portion of the disclosure of this patent document contains material that is subject to copyright protection. The copyright owner has no objection to the facsimile reproduction by anyone of the patent document or patent disclosure as it appears in the Patent and Trademark Office patent file or records, but otherwise reserves all rights whatsoever.

BACKGROUND OF THE INVENTION

1. Field of the Invention

The present invention relates generally to drain valves, and more particularly to drain valves for use with fishing vessel livewells.

2. Description of Related Art

Fishing vessels often utilize livewells to store live bait or caught fish in a controlled aquatic environment. Proper drainage of these livewells is crucial for maintaining water quality and ensuring the well-being of the stored aquatic life. Fishermen often pressurize a vessel's livewell by closing the top cover and filling the tank to its maximum capacity in order to mitigate water sloshing and reduce stress on bait fish. This method leverages basic principles of fluid mechanics and air pressure regulation to create a more stable aquatic environment.

When a livewell is only partially filled and/or left open to the atmosphere, any movement of the vessel—such as pitching, rolling, or sudden acceleration—translates into kinetic energy within the tank, causing the water to slosh about and splash around freely. This uncontrolled motion results in turbulent currents, wave action, and sudden shifts in water pressure, which can stress or injure bait fish. Fish may collide with the walls of the tank, lose protective slime or scales, and experience hypoxia due to uneven oxygen distribution in the water.

In an effort to avoid this, fishermen will often close the top cover of the livewell, creating a sealed or semi-sealed chamber, and fill the tank to maximum capacity, minimizing the air space above the water line. This has several positive technical effects as a fully filled tank has negligible free surface area for waves to form. This limits the creation of internal waves and pressure differentials that lead to sloshing. In addition, by closing the lid, the air space (if any) above the water becomes pressurized as the water moves. This dampens surface motion, acting as a cushion that resists rapid pressure changes. Finally, with less room for water to move vertically or horizontally, internal turbulence is suppressed, maintaining an environment more suitable for delicate species. Overall, this method maintains a hydrostatically stable environment, reduces physical trauma and metabolic stress, and helps bait fish survive longer and remain more active—key advantages in both recreational and commercial fishing operations.

One difficulty experienced in configuring the livewell as discussed above involves adjustments required to maintain the tank fill level at a desired pressure. Water pumped into the tank is eventually discharged overboard via an overflow drain located at or near the top of the livewell. To accomplish and maintain the desired fill configuration, the fishermen must often go down into the bilge and adjust a ball valve on the livewell pump outlet to obtain a desired flow rate (e.g. GPM). This method is imprecise often leading to the need for multiple adjustments. In addition, vessels often have small bilge spaces, and limited bilge access. The need for repeated flow rate adjustments to achieve the desired tank configuration is time consuming and cumbersome.

Accordingly, there exists a need in the art for advancing the apparatus and methods for controlling livewell operations. There further exists a need for improvements in livewell plumbing and flow control.

The art described in this section is not intended to constitute an admission that any patent, publication or other information referred to herein is "prior art" with respect to this invention, unless specifically designated as such. In addition, this section should not be construed to mean that a search has been made or that no other pertinent information as defined in 37 C.F.R. § 1.56(a) exists.

BRIEF SUMMARY OF THE INVENTION

The present invention addresses the aforementioned need by providing an adjustable livewell overflow drain valve assembly designed for threaded connection to the overflow drain port of a fishing vessel livewell to allow for water supply flow control from within the livewell. An adjustable livewell overflow drain in accordance with the present invention comprises a gate valve featuring a strainer cage and a movable gate slidable disposed within the strainer cage. The gate is operable between a fully closed position, wherein livewell water is contained within the well, and a fully open position, wherein livewell water is allowed to drain out of the well. Adjustment is achieved by manual manipulation of the gave via adjustment arms projecting from the gate and through the strainer cage. The adjustable overflow drain thus allows for flow control within the livewell thus eliminating the need for manual adjustment of any valves within the bilge.

Accordingly, it is an object of the present invention to provide advancements in the field of drain valves for fishing vessel livewells.

Yet another object of the present invention is to provide gate drain valve for use with fishing livewells.

In accordance with these and other objects, which will become apparent hereinafter, the instant invention will now be described with particular reference to the accompanying drawings.

DETAILED DESCRIPTION OF THE INVENTION

The present invention may be understood more readily by reference to the following detailed description taken in connection with the accompanying drawing figures, which form a part of this disclosure. It is to be understood that this invention is not limited to the specific devices, methods, conditions or parameters described and/or shown herein, and that the terminology used herein is for the purpose of describing particular embodiments by way of example only and is not intended to be limiting of the claimed invention. Any and all patents and other publications identified in this specification are incorporated by reference as though fully set forth herein.

In describing this invention, the word "connected" is used. By "connected" is meant that the article or structure referred to is joined, either directly, or indirectly, to another article or structure. By "indirectly joined" is meant that there may be an intervening article or structure imposed between the two articles which are "connected". "Directly joined" means that the two articles or structures are in contact with one another or are essentially continuous with one another. By adjacent to a structure is meant that the location is near the identified structure.

Also, as used in the specification including the appended claims, the singular forms "a," "an," and "the" include the plural, and reference to a particular numerical value includes at least that particular value, unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment.

Turning now to the drawings, FIGS. 1-11 depict an adjustable livewell overflow drain, generally referenced as 10, for use with marine vessel livewells in accordance with the present invention. Adjustable livewell overflow drain 10 allows for livewell system adjustments from inside the livewell to allow for livewell pressurization by controlling the drain rate of the water within the well without the need to adjust a remove valve under the deck. Adjustable livewell overflow drain 10 is preferably fabricated from glass-filled nylon to be non-corrosive and durable.

Figure 1:
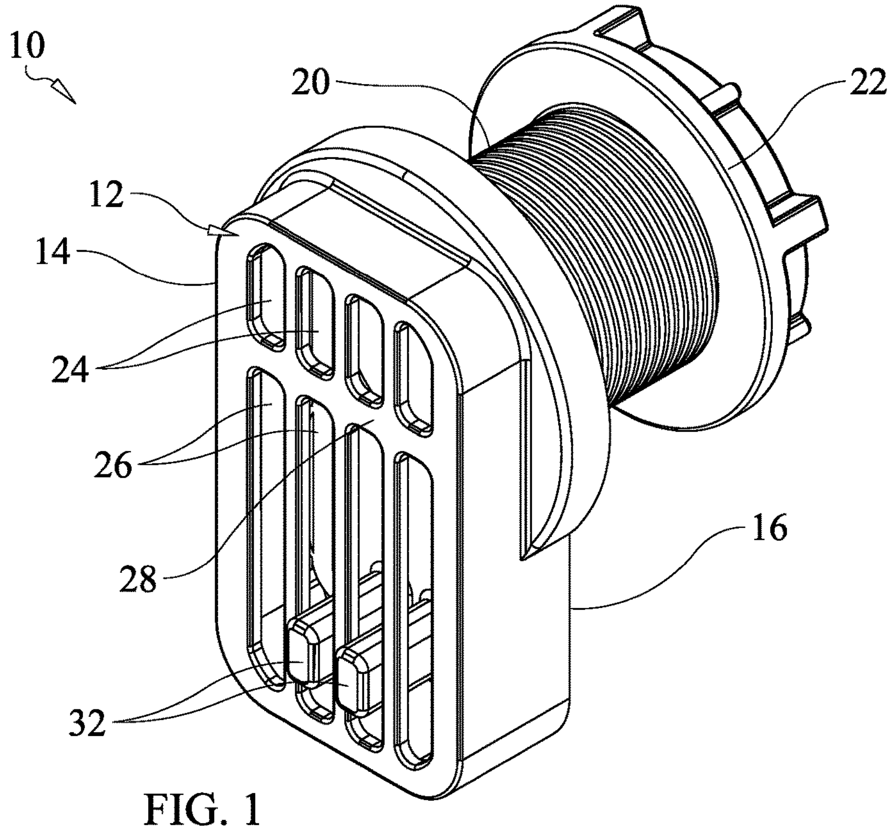
FIG. 1 a front perspective view of an adjustable livewell overflow valve for a fishing vessel livewell in accordance with the present invention, with the valve gate shown in the closed position.
Figure 2:
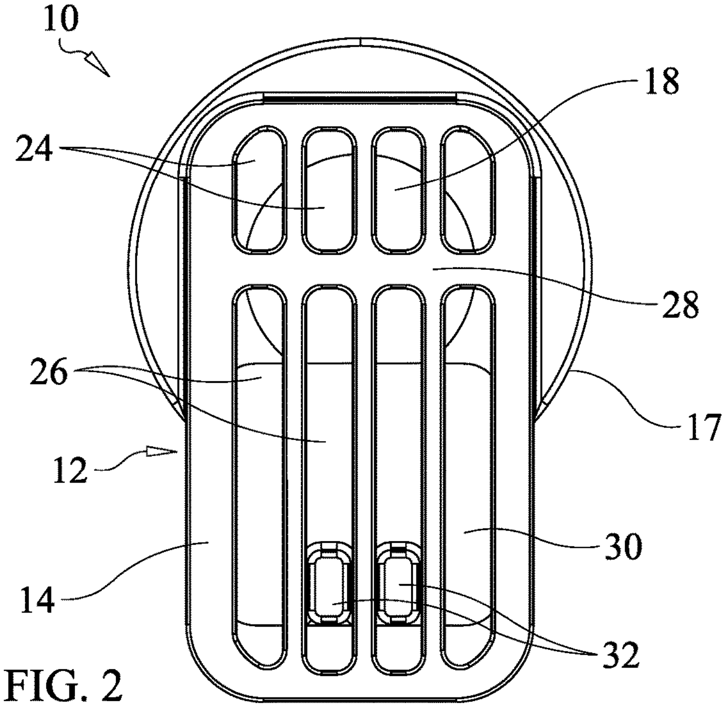
FIG. 2 is a front view thereof.
Figure 3:
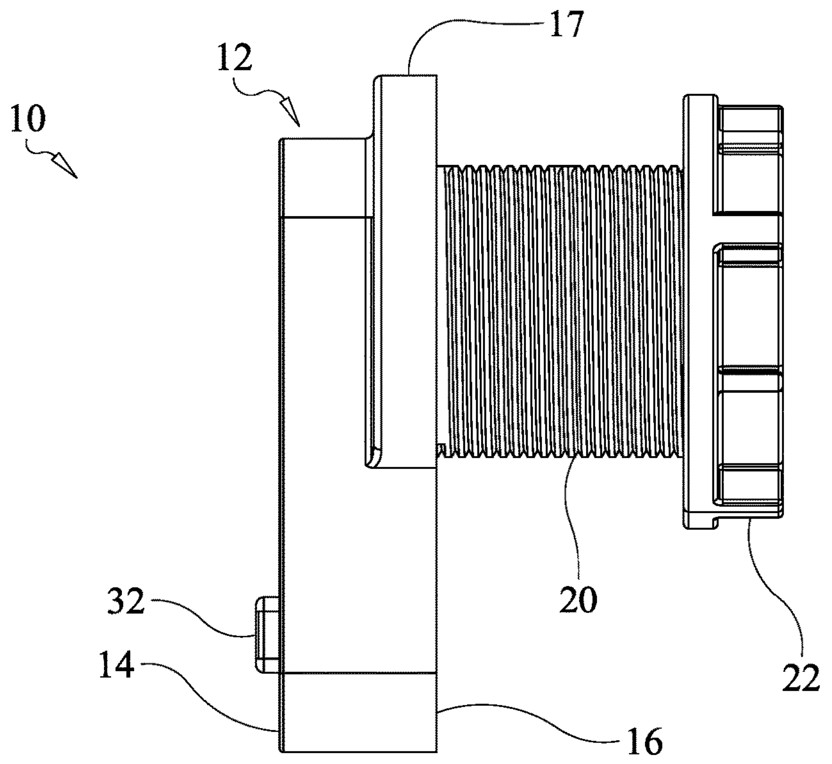
FIG. 3 is a rear view thereof.
Figure 4:
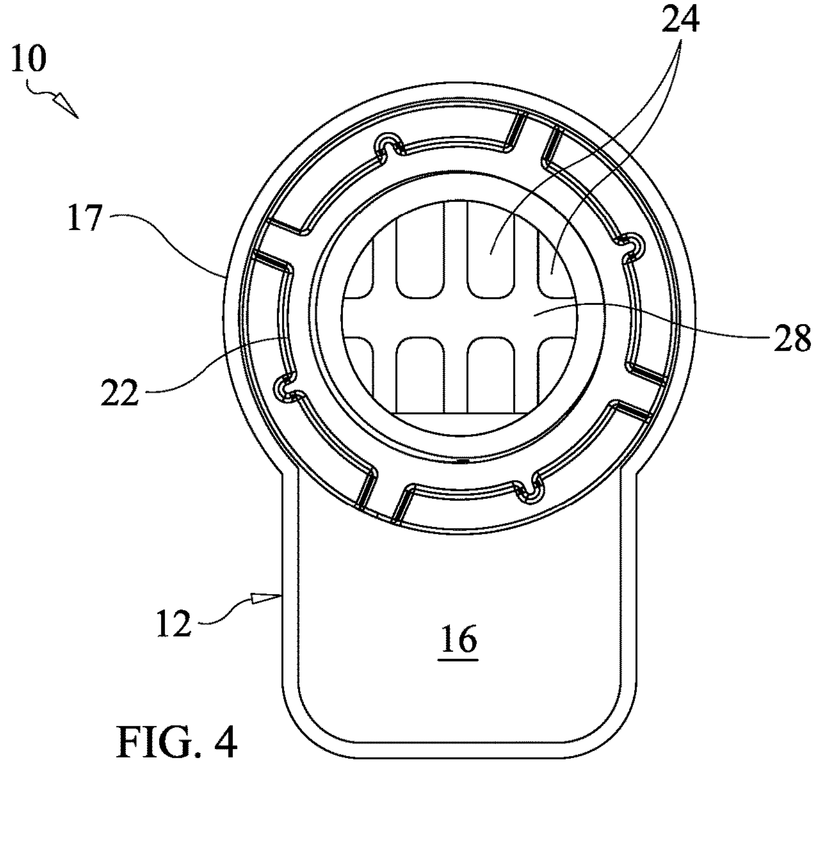
FIG. 4 is a side view thereof.
Figure 5:
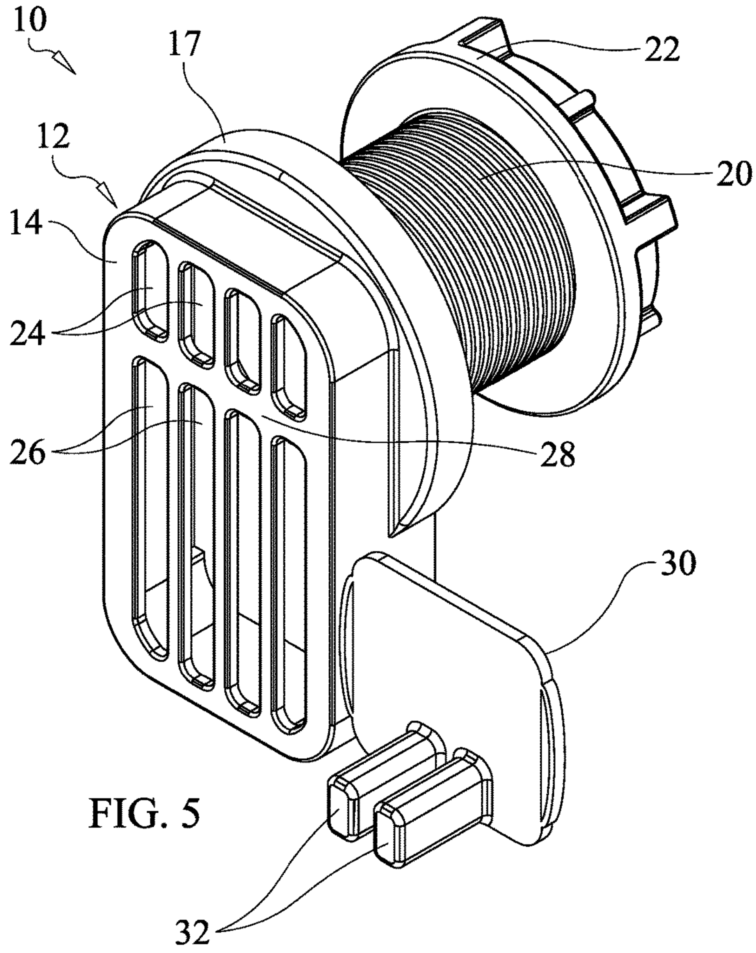
FIG. 5 is a perspective view thereof with the valve gate removed.
Figure 6:
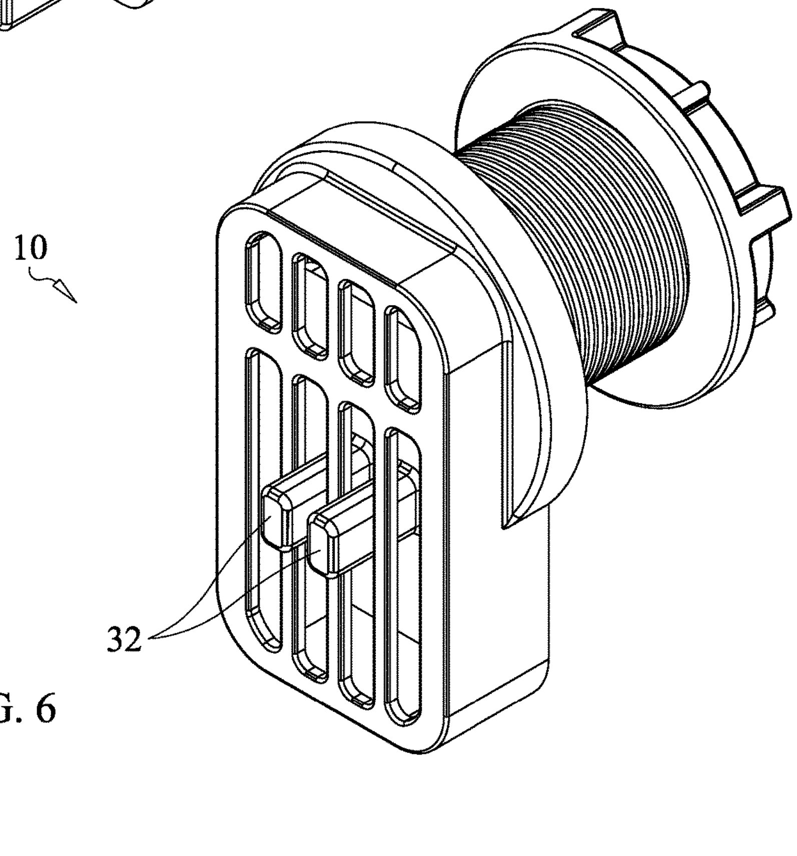
FIG. 6 is a perspective view with the valve gate in a partially closed position.
Figure 7:
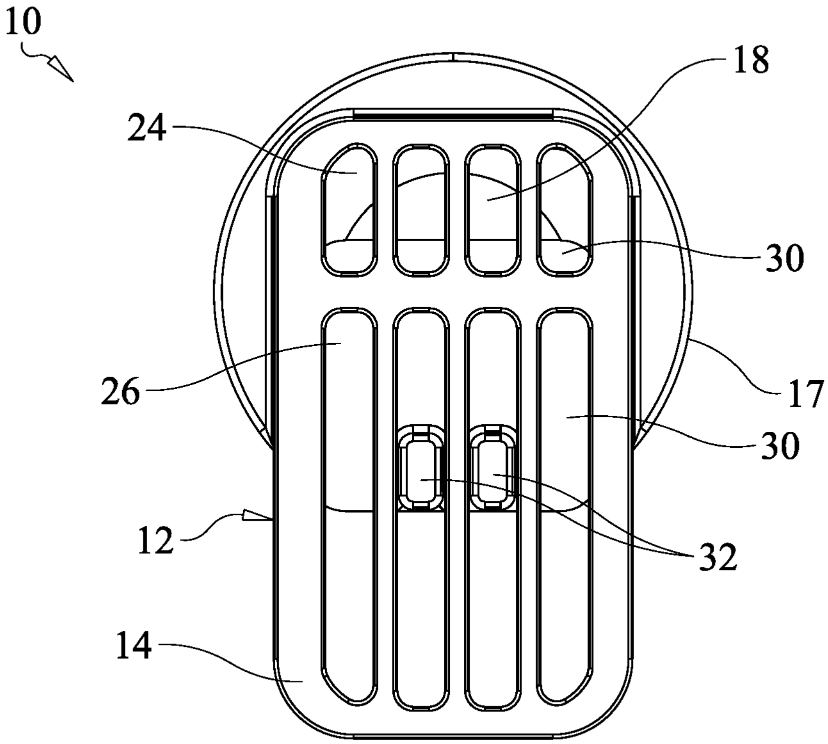
FIG. 7 is a front view thereof.
Figure 8:
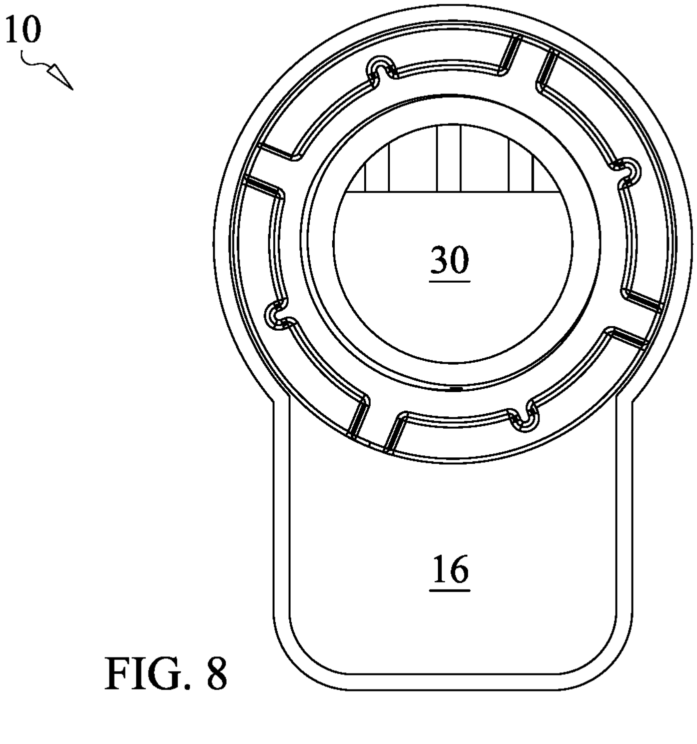
FIG. 8 is a rear view thereof.
Figure 9:
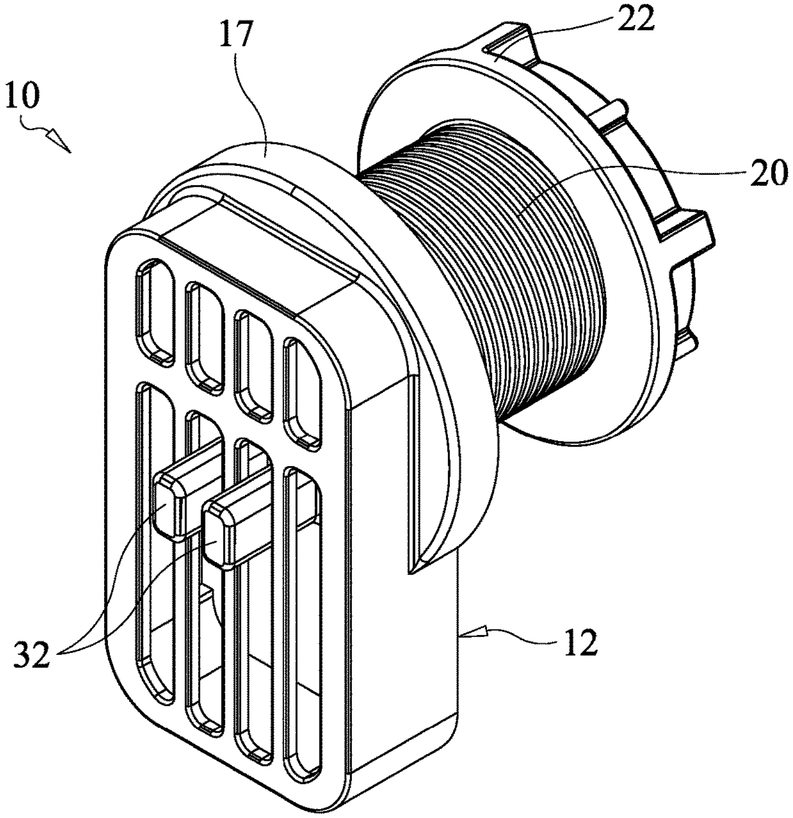
FIG. 9 is a perspective view with the valve gate in a fully closed position.
Figure 10:
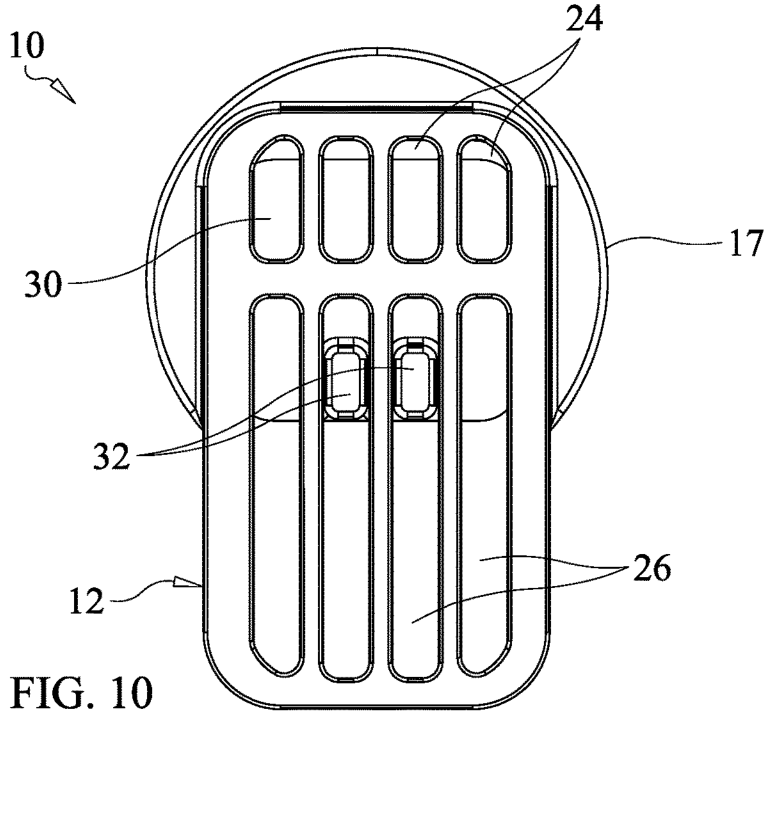
FIG. 10 is a front view thereof.
Figure 11:
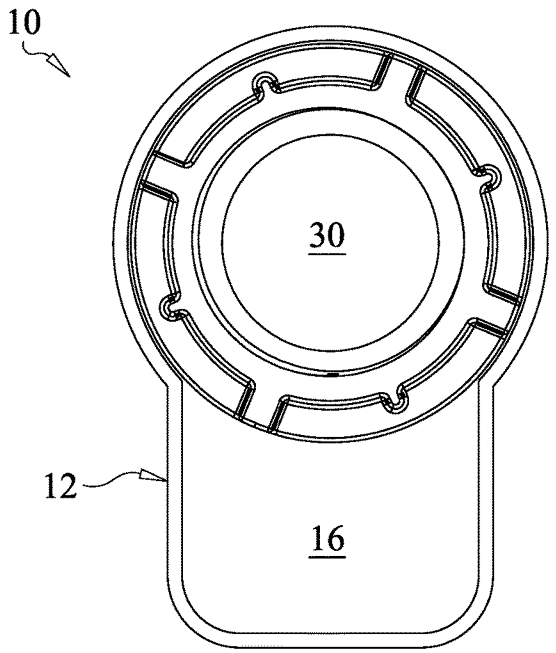
FIG. 11 is a rear view thereof.

FIGS. 1-4 illustrate adjustable livewell overflow drain 10 in a fully open configuration. FIG. 5 is a perspective view of the adjustable livewell overflow drain 10 with the valve gate removed. FIGS. 6-8 illustrate adjustable livewell overflow drain 10 in a partially open/closed configuration. FIGS. 9-11 illustrate adjustable livewell overflow drain 10 in a fully closed configuration Adjustable livewell overflow drain 10 includes a main body, generally referenced as 12, having a front side 14 and a rear side 16. The front side 14 is configured as a debris strainer as more fully discussed below. The rear side 16 of main body 12 defines a circular structure 17 defining an outlet aperture 18. Circular structure 17 provides a water-tight seal against the interior livewell wall when installed. A tubular, externally threaded male nipple 20 in fluid communication with aperture 18 extends rear of circular structure 17 to provide a water outlet/discharge conduit. Threaded male nipple 20 is intended for installation on the livewell overflow drain port and secured to the livewell by the collar 22. In addition, the nipple 20 is preferably connected to additional tubing or pipe that discharges water overboard.

The front side 14 of main body 12 defines first and second sets of slotted inlet apertures, referenced as 24 and 26 respectively, whereby the front side is configured as strainer. Slotted inlet apertures 24 and 26 are separated by a transvers cross bar 28. Accordingly, the front said 14 of main body 12 is generally configured to function a debris strainer and main body 12 to function as a strainer cage, whereby water is allowed to flow into said main body through said slotted apertures while certain debris does not. Main body 12 houses a valve gate 30 slidably movable therein, and particularly relative to outlet aperture 18, such that valve gate 30 controls the flow of fluid flowing through and out of threaded nipple 20. Valve gate 30 includes a pair of projecting arms, referenced as 32, which project through slotted inlet apertures 26 from the front 14 of main body 12.

Valve gate 30 is movably disposed within main body 12 and is manually linearly adjustable operable between an open position as shown in FIGS. 1-4, a partially open/closed position as shown in FIGS. 6-8, and a closed position as shown in FIGS. 9-11. Actuation of valve gate 30 is facilitated by manual adjustment thereof via use of projecting arms 32 which are slidably received within inlet apertures 26. In the open position, depicted in FIGS. 1-4, valve gate 30 is displaced to allow water to flow freely through valve assembly 10 and drain out of the livewell. In the closed position, depicted in FIGS. 9-11, valve gate 30 is disposed in sealed covering relation with aperture 18 such that it substantially prevents water from flowing through valve assembly 10, and more particularly through the outlet defined by threaded male nipple 20. Cross bar 28 may function as a stop structure that provides tactile feedback to the user to indicate that valve gate 30 is fully closed when arms 32 engage crossbar 28.

As noted above, actuation movement of valve gate 30 is preferably facilitated by slidable movement of arms 32 within slotted apertures 26 disposed on the front 14 of main body 12. In alternate embodiments, however, actuation of valve gate 30 may be facilitated by a handle or other equivalent means of manual or automated actuation that is/are accessible from the exterior of the main body 12 and or remotely controlled, such as by wire or wireless communication. In one embodiment, valve gate 10 may be controlled via wireless communication from a smartphone using a downloadable software application (e.g. App). In any event, the handle or actuator enables an operator to easily control the position of the valve gate 30 at any position between fully closed and fully open to selectively regulate the drainage of the livewell.

Figure 12:
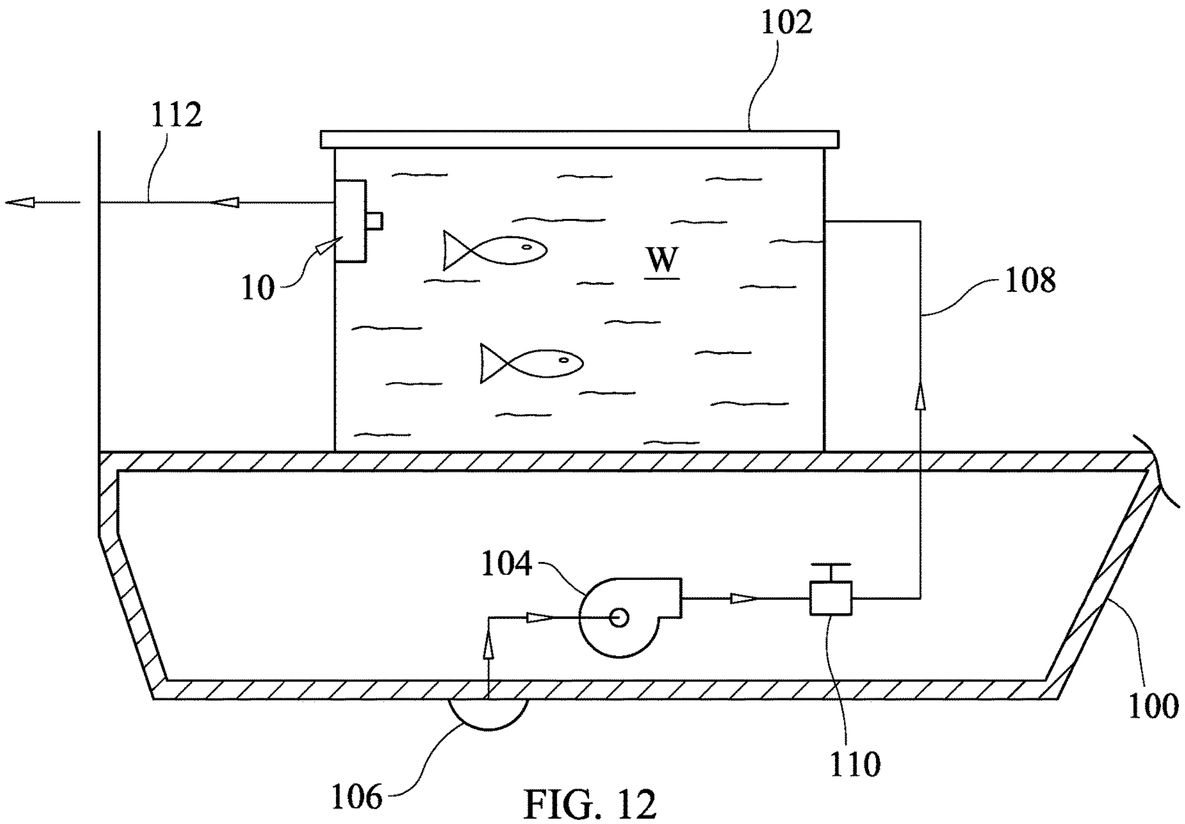
FIG. 12 is a schematic block diagram illustrating a livewell system adapted with an adjustable livewell overflow drain in accordance with the present invention.

FIG. 12 is a schematic illustration of a marine vessel 100, having livewell 102, supplied with raw water via a pump 104 having an inlet drawing water via a thru-hull fitting 106. As discussed above, pump 104 has outlet piping 108 including a manual valve 110 that provides a supply of water to live well 102. Live well 102 is maintained in a pressurized state wherein it is completely or substantially completely filled with water "W". An adjustable livewell overflow drain 10, in accordance with the present invention is mounted within livewell 102. Adjustable livewell overflow drain 10 is adjusted to selectively restrict the outflow and discharge of water from the livewell via discharge tubing 112. The present invention thus advances the field of livewell systems by effectively moving the flow control from the below deck and/or bilge located valve 110, to the interior of the livewell via adjustable livewell overflow drain 10.

As should now be apparent, the adjustable livewell overflow drain allows for quick and easy water flow adjustments required to maintain the tank fill level at a desired pressure without requiring below deck access or access to the vessel bilge. Water pumped into the tank is eventually discharged overboard via adjustable livewell overflow drain while the valve gate is set to provide the desired amount of flow resistance to maintain the livewell substantially full and/or pressurized. Further, by incorporating a strainer cage and a movable gate, the assembly ensures the unobstructed flow of water while preventing the egress of debris. Additionally, the threaded connection allows for easy installation and maintenance of the assembly on various types of fishing vessels.

The instant invention has been shown and described herein in what is considered to be the most practical and preferred embodiment. It is recognized, however, that departures may be made therefrom within the scope of the invention and that obvious modifications will occur to a person skilled in the art.

What is claimed is:

1. An adjustable livewell overflow drain for connection to a drain port of a marine vessel livewell, said overflow drain comprising:

a main body adapted for connection to the drain port within the livewell;

said main body having a front and a rear;

the front of said main body defining at least one slotted inlet aperture;

the rear of said main body defining an outlet aperture;

a tubular externally threaded nipple in fluid communication with said outlet aperture, and a collar threadably connected thereto, whereby said nipple and said collar function to affix said main body to the live well drain port;

a valve gate movably disposed within said main body and configurable between a closed position in covering relation with said outlet aperture wherein livewell water is contained within the livewell, and an open position wherein livewell water is allowed to flow from said livewell through said outlet aperture; and wherein said valve gate further includes at least one actuating arm projecting therefrom and through said at least one slotted inlet aperture to allow for user actuation of said valve gate from the exterior of said main body.

2. The adjustable livewell overflow drain according to claim 1, wherein the main body is constructed of a corrosion-resistant material suitable for marine environments.

3. The drain valve assembly of claim 1, further comprising sealing means configured to provide a watertight connection between the main body and the drain port of the fishing vessel livewell.

4. The drain valve assembly of claim 1, wherein said valve gate is operable to move between the closed position and the open position via manual or automated means.

5. An adjustable livewell overflow drain for connection to the drain port of a marine vessel livewell, said overflow drain comprising:

a main body adapted for connection to the drain port within the livewell;

said main body having a front and a rear;

the front of said main body defining a plurality of slotted inlet apertures;

the rear of said main body defining an outlet aperture;

a tubular externally threaded nipple in fluid communication with said outlet aperture and extending from the rear of said main body, and a collar threadably connected thereto, whereby said nipple and said collar function to affix said main body to the live well drain port;

a valve gate movably disposed within said main body and configurable between a closed position in covering relation with said outlet aperture wherein livewell water is contained within the livewell, and a plurality of open and partially open positions wherein livewell water is allowed to flow from said livewell through said outlet aperture;

said valve gate including at least one actuating arm projecting therefrom and through one of said plurality slotted inlet apertures, whereby said valve gate may be manually actuated by sliding said at least one actuating arm within said one of said plurality of slotted inlet apertures.

6. The adjustable livewell overflow drain according to claim 5, wherein the main body is constructed of a corrosion-resistant material suitable for marine environments.

7. The drain valve assembly of claim 5, further comprising sealing means configured to provide a watertight connection between the main body and the drain port of the fishing vessel livewell.

8. The drain valve assembly of claim 5, wherein said valve gate is operable to move between the closed position and the open position via manual or automated means.

* * * * *